Aug. 26, 1947.  W. J. TIERNEY  2,426,532
PINTLE HOOK FOR COUPLING DEVICES
Filed Aug. 3, 1944  2 Sheets-Sheet 2
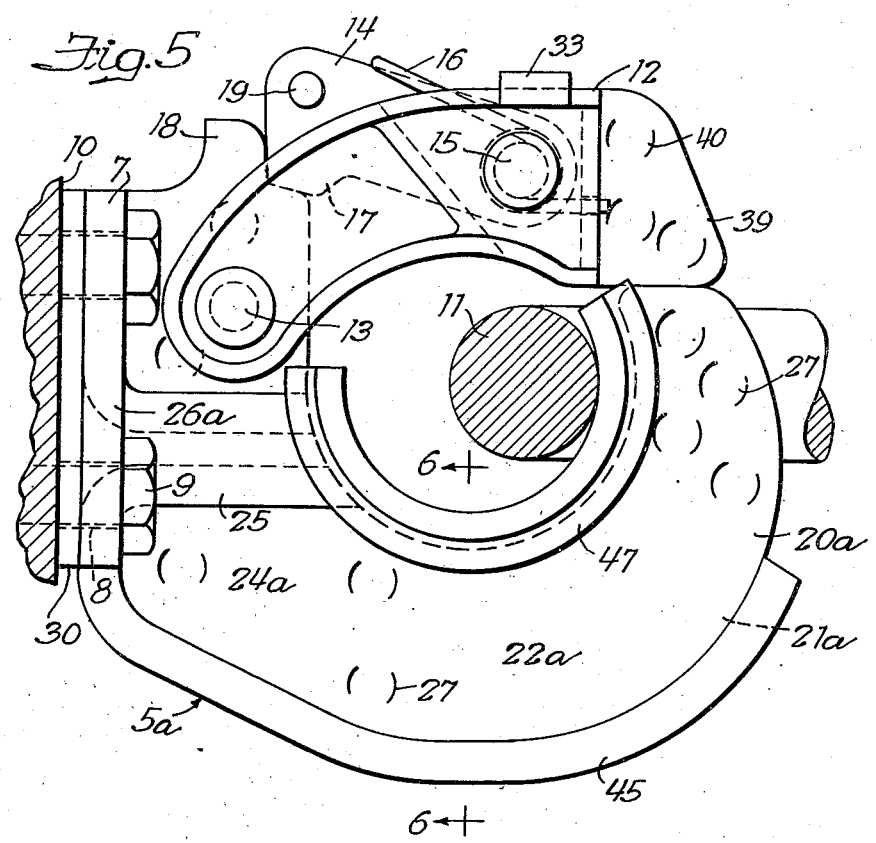
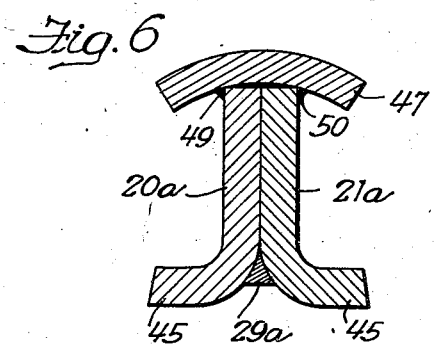
Inventor
William J. Tierney Patented Aug. 26, 1947

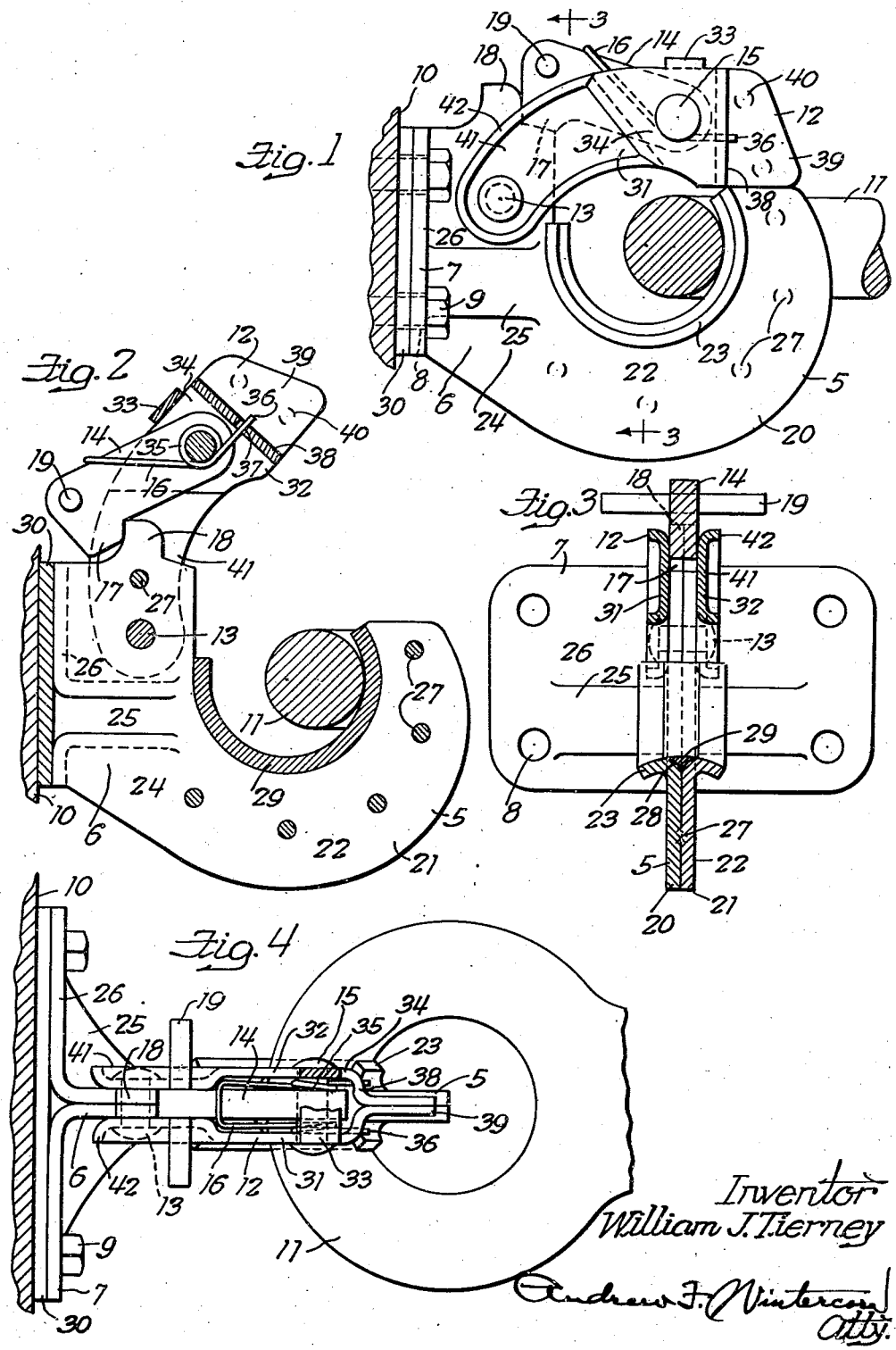

2,426,532

UNITED STATES PATENT OFFICE 2,426,532

PINTLE HOOK FOR COUPLING DEVICES

William J. Tierney, Rockford, Ill., assignor to The Atwood Vacuum Machine Company, Rockford, Ill., a copartnership composed of Seth B. Atwood and James T. Atwood Application August 3, 1944, Serial No. 547,921

31 Claims. (Cl. 280—33.15)

1

This invention relates to coupling devices and is particularly concerned with a new and improved pintle hook especially designed for towing heavy and medium military vehicles of various kinds, although the same is adapted for various uses.

The principal object of my invention is to provide a light, but extremely strong and durable, pintle hook made of welded stamped sheet metal construction, a special feature of the construction, in one form, consisting in the welding together of the hook parts circumferentially of its inner diameter, where a fillet occurs between the outwardly projecting annular flanges of said parts, thereby nicely rounding the inside of the hook and adding greatly to its strength and wear resistance. In another form, flanges are provided on the outer diameter and the parts are similarly welded together in the fillet for strength, and a liner is provided for the inner diameter and welded to both parts of the hook body, substantially adding both wear resistance and strength.

Another object of my invention is to provide a hook of the kind mentioned having a keeper or locking arm pivotally mounted on the shank of the hook, and having a spring pressed latch pivoted on the keeper and arranged to lock it releasably in either a closed or open out-of-the-way position, the latch having a tooth thereon which engages on either side of a tooth on the shank portion of the hook, so that the keeper while locked securely enough in either position may, nevertheless, be quickly and easily released.

Another object consists in providing a keeper or locking arm made of welded stamped sheet metal construction for lightness, strength, and durability, the body of the keeper being preferably formed from a single stamping, in which there are counterpart halves interconnected by an integral web for added strength and rigidity in the vicinity of the pivot for the latch, where considerable strains are apt to be imposed in the running of the trailer and the keeper is subjected to the usual blows in the shifting about of the trailer in relation to its towing vehicle. In the sheet metal construction of the keeper, the opportunity is afforded of providing flanges around the edges of the pivoted portions to lend the desired strength and rigidity where the greatest stresses and strains are imposed, and the sheet metal construction is also of advantage in that it provides the necessary space for the latch in the keeper without necessity for expensive machining operations, the latch being pivoted on a rivet passed through the spaced halves of the

2 keeper body, which halves define ears for engagement on opposite sides of the shank portion of the hook for pivotally mounting the keeper thereon, so that a further saving is realized in the avoidance of expensive machine operations that would otherwise be required in that portion of the keeper.

The invention is illustrated in the accompanying drawings, in which—

Fig. 1 is a side view of a pintle hook made in accordance with my invention, and showing in section a coupler eye in operative relation thereto;

Fig. 2 is a vertical section through the pintle hook showing the keeper or locking arm in open position;

Fig. 3 is a cross-section on the line 3—3 of Fig. 1;

Fig. 4 is a top view of Fig. 1;

Fig. 5 is a view similar to Fig. 1, showing a modified or alternative construction, and Fig. 6 is a sectional detail on the line 6—6 of Fig. 5.

Similar reference numerals are applied to corresponding parts throughout the views.

Referring first to Figures 1 to 4, the hook is designated generally by the reference numeral 5, and has an attaching shank portion 6, on which there are ears 7 having holes 8 to receive bolts 9 to fasten the hook to the front portion of a trailing vehicle, as indicated at 10 in Figs. 1, 2, and 4. 11 is a coupler eye carried on the back of the towing vehicle, adapted to be entered in the hook in the manner shown in Figs. 1, 2, and 4, and 12 is a keeper or locking arm pivoted, as at 13, on the shank portion 6 of the hook and arranged to be locked releasably in either the closed position, shown in Fig. 1, or the open position, shown in Fig. 2, by means of a latch 14. The latter is pivoted at 15 on the keeper, and has a spring 16 tending normally to urge the same in a counterclockwise direction as viewed in Figs. 1 and 2, whereby it is arranged to be held under spring pressure with its tooth 17 engaged either in front of the tooth 18 on the shank 6, as in Fig. 1, or behind the tooth 18, as in Fig. 2, thereby locking the keeper releasably and yet quite securely in either of the two positions. A cross-pin 19 on the toothed outer end of the latch serves as a handle for easy unlocking of the keeper from either side of the hook.

The operation of the device is believed to be clear from the foregoing description. When the keeper is in the open position, shown in Fig. 2, there is obviously ample room to maneuver the eye 11 into coupling position and engage it on the hook. On the other hand, when the keeper is closed, as in Fig. 1, it positively prevents accidental disengagement of the eye from the hook, because the latch locks the keeper securely in the closed position.

The hook 5, in accordance with my invention, has the body thereof formed by two counterpart halves 20 and 21, each of which is stamped from a single piece of sheet metal to provide a hook portion 22 that is annularly flanged on its inner diameter, as at 23, and an attaching shank portion 24 that is formed between dies to provide a hollow reinforcing web portion 25 of triangular form rigidly interconnecting the attaching ear portion 26 and attaching shank portion 24 at right angles to one another. The counterpart halves 20 and 21 of the hook are spot welded together at spaced intervals in the hook portions 22 and attaching shank portions 24, as indicated at 27 in Figs. 1 and 2. The fillet 28 extending throughout the inner circumference of the hook between the flanges 23 is filled by welding along this joint, as indicated at 29 in Figs. 2 and 3, whereby to nicely round the inside of the hook flush with the inner surfaces of the flanges 23, as clearly appears in Fig. 3, and firmly and rigidly interconnect the halves of the hook body where the greatest stresses and strains are imposed, and also provide hard wear resisting metal throughout this portion that is subjected to the greatest wear. A base plate 30 is preferably welded to the attaching ears 26 to lend further strength and rigidity to the hook, and has holes therein registering with the bolt holes 8, as indicated in Figs. 1 and 4, for extension therethrough of the bolts. It is obvious, therefore, that I have provided a hook of light and relatively cheap stamped sheet metal construction having the desired strength, rigidity, and durability.

The keeper or locking arm 12 is preferably stamped from a single piece of sheet metal, providing two counterpart halves 31 and 32 interconnected by an integral web 33, which serves as a spacer for the portions 34 through which the rivet 15 is entered for pivotally mounting the latch 14, besides strengthening and rigidifying this portion of the keeper where the greatest stresses and strains are apt to be concentrated in so far as any forces expended on the keeper 12 in the direction of forcibly releasing the latch 14 are concerned. The fixed spacing of the portions 34 is also important from the standpoint that the two coils 35 of the grasshopper type spring 16 require sufficient space therefor on opposite sides of the latch 14 to insure the desired freedom of action. The free ends 36 of the coils 35 extend through holes 37 provided therefor in the adjacent portions 38 of the halves 31 and 32 of the keeper body, these transversely extending portions 38 interconnecting the spaced intermediate portions 34 with the abutting end portions 39, which are spot welded together, as indicated at 40, to provide a solid end to engage the end of the hook 5, in the manner shown in Figs. 1 and 4. The halves 31 and 32 are dished to form pivoting ear portions 41 through which the lever 13 for pivotally connecting the parts is entered, the dished portions 41 being in closer spaced relation than the intermediate portions 34 of the keeper and straddling the attaching shank portion 6 of the hook. Circumferential flanges 42 are formed on the dished portions, thereby adding greatly to the strength and rigidity of these portions where the greatest stresses and strains are concentrated when the keeper is subjected to the blows of the eye 11 as the trailer and its towing vehicle shift in relation to one another in travel. The toothed free end of the latch 14 is guided between the dished portions 42, so as to be kept in the proper plane for cooperation with the tooth 18 on the attaching shank portion of the hook, so that there is no likelihood of accidental disengagement of the tooth 17 from the tooth 18 in either the closed or opened position of the keeper. The latch 14 is a one-piece sheet metal stamping perforated to receive the rivet 15 and cross-pin 19.

It should be clear from the foregoing that the sheet metal keeper and latch are relatively light, being of stamped sheet metal construction, but have the requisite strength and rigidity by virtue of the interconnecting web 33 between the halves of the keeper and the welding together of the abutting end portions 39 and the dishing and flanging of the pivoted ear portions 41. The elimination of expensive machining operations makes this keeper and latch assembly available at much lower cost.

The hook 5a illustrated in Figs. 5 and 6 is of generally similar form and is adapted to cooperate with a coupler 11 in a similar manner. The locking arm 12 is pivoted at 13 on the shank portion of the hook 5a and has a latch 14 pivoted thereon at 15 and arranged to engage either side of the tooth 18 on the shank portion of the hook to lock the arm 12 releasably in either open or closed position, similarly as in the form disclosed in Figs. 1 to 4. The hook 5a, like the hook 5, has the body thereof formed by two counterpart halves 20a and 21a. Each half is stamped from a single piece of sheet metal to provide a hook portion 22a that is annularly flanged on its outer diameter, as at 45, and an attaching shank portion 24a formed between dies to provide a hollow reinforcing web portion 25 of triangular form rigidly interconnecting the attached ear portions 26 and attaching shank portions 24a at right angles to one another. It will be noticed that the reinforcing flanges 45 on the two halves are coextensive at their inner ends with the lower portions of the attaching ears 26a, thus greatly strengthening the hook structure and greatly increasing the rigidity thereof. The halves 20a and 21a are spot-welded together at spaced intervals, as indicated at 27, in the hook portions 22a and attaching shank portions 24a. Furthermore, the fillet 48 extending the full length of the flanges 45 on the outer circumference of the hook is nearly filled by arc welding along this joint, as indicated at 29a in Fig. 6, thus firmly and rigidly interconnecting the halves of the hook body and greatly increasing its strength and resistance to deformation under heavy stress and strain. A hardened sheet metal liner 47 of arcuate form in transverse section and approximately semicircular form in longitudinal section is inserted in the hook body, as shown, with the convex inner circumference 48 providing a nicely rounded surface inside the hook for cooperation with the coupler eye 11, so that wear on these interengaged parts is reduced to a minimum. The liner is arc welded to the hook body along the inner circumference on both sides of said body, as indicated at 49 and 50 in Fig. 6, thereby further adding strength and rigidity to the hook structure and eliminating likelihood of the liner being displaced from its initial position in service.

It is believed the foregoing description conveys a good understanding of the objects and advantages of my invention. The appended claims have been drawn to cover all legitimate modifications and adaptations.

I claim:

1. In a coupler device suitable for vehicle towing purposes, the combination with a stationary substantially semi-circular hook having an attaching shank portion rigid with and extending from one end thereof and having a projection thereon, a closure element for the hook pivoted on said shank portion, and a latch pivoted on the closure element and having a projection arranged to engage selectively on either side of the first named projection to lock said closure element selectively in either closed or open position relative to said hook.

2. In a coupler device suitable for vehicle towing purposes, the combination with a stationary substantially semi-circular hook having an attaching shank portion rigid with and extending from one end thereof and having a projection thereon, a closure element for the hook pivoted on said shank portion, a latch pivoted on the closure element and having a projection arranged to engage selectively on either side of the first named projection to lock said closure element selectively in either closed or open position relative to said hook, and spring means normally urging said latch to swing in a direction to engage the projection thereon with the first projection.

3. In a coupler device suitable for vehicle towing purposes, the combination with a stationary substantially semi-circular hook having an attaching shank portion rigid with and extending from one end thereof and having a projection thereon, a closure element for the hook pivoted on said shank portion, a latch pivoted on the closure element and having a projection arranged to engage selectively on either side of the first named projection to lock said closure element selectively in either closed or open position relative to said hook, spring means normally urging said latch to swing in a direction to engage the projection thereon with the first projection, and a cross pin on the free end of said latch for use in moving the same manually in the opposite direction to release the closure element for movement to or from closed or opened position.

4. In a coupler device of the character described, a hook member for connection to a draft member, comprising two abutting counterpart sheet metal body halves of hook form having flanges provided thereon circumferentially of the inner diameter bent outwardly in opposite directions with respect to the one another so as to define a fillet between the abutting bent portions circumferentially of the inner diameter of said hook, and a filling of hard wear resisting metal in said fillet.

5. In a coupler device of the character described, a hook member for connection to a draft member, comprising two abutting counterpart sheet metal body halves of hook form having flanges provided thereon circumferentially of the inner diameter bent outwardly in opposite directions with respect to one another so as to define a fillet between the abutting bent portions circumferentially of the inner diameter of said hook, and a filling of hard wear resisting metal in said fillet, comprising weld metal integrally connecting said body halves.

6. In a coupler device of the character described, a hook member for connection to a draft member, comprising two abutting counterpart sheet metal body halves of hook form having flanges provided thereon circumferentially of the inner diameter bent outwardly in opposite directions with respect to one another so as to define a fillet between the abutting bent portions circumferentially of the inner diameter of said hook, and a filling of hard wear resisting metal in said fillet, comprising weld metal integrally connecting said body halves, said filling forming the portion of smallest radius on the inside of said hook whereby to absorb most of the wear when said hook is connected to a draft member.

7. In a coupler device of the character described, a hook member for connection to a draft member, comprising two abutting counterpart sheet metal body halves of hook form having flanges provided thereon circumferentially of the inner diameter bent outwardly in opposite directions with respect to one another, whereby to reinforce and lend rigidity to said hook member, said body halves having abutting shank portions bent outwardly in opposite directions relative to one another to form attaching ears in substantially coplanar relation to one another, and an attaching plate disposed in abutment with the backs of and adapted to interconnect said ears, the plate and ears having registering openings adapted to receive fastening elements for fastening the hook to a vehicle.

8. A device as set forth in claim 7, wherein said body halves are welded together around the inner circumference of the hook, whereby the hard weld metal adds wear resistance to the parts subject to most wear in service.

9. In a coupler device of the character described, a hook member for connection to a draft member, comprising two abutting counterpart sheet metal body halves of hook form having flanges provided thereon circumferentially of the inner diameter bent outwardly in opposite directions with respect to one another, said body halves being welded together around the inner circumference of the hook, whereby the hard weld metal adds wear resistance to the parts subject to most wear in service.

10. In a coupler device of the character described, a hook member for connection to a draft member, comprising two abutting counterpart sheet metal body halves of hook form, said body halves being welded together around the inner circumference of the hook, whereby the hard weld metal exposed on the wearing surface of the inner circumference of the hook adds wear resistance to the portion which is subject to most wear in service.

11. As an article of manufacture, a hook member comprising two abutting counterpart sheet metal body halves of hook form, said body halves being welded together around the inner circumference, whereby the hard weld metal exposed on the wearing surface of the inner circumference of the hook adds wear resistance to the portion which is subject to most wear in service.

12. In a coupler device of the character described, a hook member for connection to a draft member, comprising two abutting counterpart sheet metal body halves of hook form, having flanges provided thereon circumferentially of the inner diameter bent outwardly in opposite directions with respect to one another, whereby to reinforce and lend rigidity to said hook member, said body halves having abutting shank portions bent outwardly in opposite directions relative to one another, to form attaching ears in substantially coplanar relation to one another, and reinforcing ribs formed in the shank portions extending diagonally between and integrally connecting the ears with the shank portions.

13. In a coupler device of the character described, a hook member for connection to a draft member, comprising two abutting counterpart sheet metal body halves of hook form having flanges provided thereon circumferentially of the inner diameter bent outwardly in opposite directions with respect to one another, whereby to reinforce and lend rigidity to said hook member, said body halves having abutting shank portions bent outwardly in opposite directions relative to one another to form attaching ears in substantially coplanar relation to one another, reinforcing ribs formed in the shank portions extending diagonally between and integrally connecting the ears with the shank portions, and an attaching plate disposed in abutment with the backs of and adapted to interconnect said ears, the plate and ears having registering openings adapted to receive fastening elements for fastening the hook to a vehicle.

14. In a coupler device of the character described, a hook member for connection to a draft member, comprising two abutting counterpart sheet metal body halves of hook form, said body halves having abutting shank portions bent outwardly in opposite directions relative to one another to form attaching ears in substantially coplanar relation to one another, and an attaching plate disposed in abutment with the backs of and adapted to interconnect said ears, the plate and ears having registering openings adapted to receive fastening elements for fastening the hook to a vehicle.

15. A device as set forth in claim 14 wherein said body halves are welded together around the inner circumference of the hook, whereby the hard weld metal adds wear resistance to the parts subject to most wear in service.

16. In a vehicle towing coupler, a stationary substantially semi-circular hook member having an attaching shank portion rigid with and extending from one end thereof in the same substantially vertical plane with the hook and formed to provide an upwardly projecting tooth on the top thereof, a closure element for the hook having a forked shank portion straddling the shank portion of the hook and pivotally connected thereto, and a latch pivoted in the forked portion of said closure element in outwardly spaced relation to said hook shank and having a tooth on the inner free end thereof arranged to engage selectively on the front or back of the tooth on said hook shank, whereby to lock said closure element selectively in either closed or open position relative to said hook.

17. In a vehicle towing coupler, a stationary substantially semi-circular hook member having an attaching shank portion rigid with and extending from one end thereof in the same substantially vertical plane with the hook and formed to provide an upwardly projecting tooth on the top thereof, a closure element for the hook having a forked shank portion straddling the shank portion of the hook and pivotally connected thereto, a latch pivoted in the forked portion of said closure element in outwardly spaced relation to said hook shank and having a tooth on the inner free end thereof arranged to engage selectively on the front or back of the tooth on said hook shank, whereby to lock said closure element selectively in either closed or open position relative to said hook, and spring means normally tending to swing said latch inwardly toward the hook shank.

18. In a coupler, a hook member having a shank portion in the same substantially vertical plane with the hook and formed to provide an upwardly projecting tooth on the top thereof, a closure element for the hook having a forked shank portion straddling the shank portion of the hook and pivotally connected thereto, a latch pivoted in the forked portion of said closure element in outwardly spaced relation to said hook shank and having a tooth on the inner free end thereof arranged to engage selectively on the front or back of the tooth on said hook shank, whereby to lock said closure element selectively in either closed or open position relative to said hook, and spring means normally tending to swing said latch inwardly toward the hook shank, comprising a grasshopper type spring having two coils disposed on opposite sides of said latch in the forked portion of said closure element and an arm portion interconnecting the one ends of said coils and straddling said latch, the other ends of said coils being suitably fixed in relation to said closure element.

19. In a coupler comprising a hook adapted for a connection to a draft member and having a shank portion, a closure element for said hook adapted to be pivotally mounted on said shank portion and to engage over the outer end of said hook to retain the draft member therein, said closure element comprising an elongated sheet metal body made up of counterpart halves disposed in spaced relation to form a fork portion adapted to straddle the shank portion of said hook for pivotal connection therewith, said halves being bent to provide parallel abutting outer end portions adapted to be secured together and to form the closing portion of said closure element for engagement with the outer end of the hook, said forked portion being elongated to provide space therein to house a latch for locking the closure element in opened or closed position relative to said hook, and a latch mounted in said forked portion.

20. A device as set forth in claim 19 wherein said closure element is formed from a single piece of sheet metal, the halves of said body being integrally connected by a transverse web intermediate the ends of said body halves which serves as a spacer to space said halves in the forked portion of the closure element.

21. A device as set forth in claim 19, wherein the halves of said closure element body are dished inwardly toward one another to reinforce the pivoted end portions by defining circumferentially extending flanges around these dished portions.

22. A device as set forth in claim 19, wherein the halves of said closure element body are dished inwardly toward one another to reinforce the pivoted end portions by defining circumferentially extending flanges around the dished portions, said dished portions being elongated so as to provide guide surfaces on the inner sides thereof for sliding guiding contact with the latch disposed in the forked portion of said closure element.

23. In a coupler device of the character described, a hook member for connection to a draft member, comprising two abutting counterpart sheet metal body halves of hook form having flanges provided thereon circumferentially of the outer diameter bent outwardly in opposite directions with respect to one another, the inner attaching ends of said body halves being formed to provide attaching ears bent outwardly in opposite directions with respect to one another substantially at right angles to the plane of the body and substantially in coplanar relation, the lower portions of said ears being coextensive with said circumferential flanges.

24. A structure as set forth in claim 23, including reinforcing ribs formed in the shank portions extending diagonally between and integrally connecting the ears with the shank portions.

25. In a coupler device suitable for vehicle towing purposes, the combination with a stationary substantially semi-circular hook having an attaching shank portion rigid with and extending from one end thereof and having a projection thereon, a closure element for the hook pivoted on the upper portion of said shank portion and tending to gravitate to a closed position, and a latch pivoted on the closure element and arranged to engage selectively on either side of the aforesaid projection to lock said closure element releasably in either closed or open position relative to said hook.

26. In a coupler device suitable for vehicle towing purposes, the combination with a stationary substantially semi-circular hook having an attaching shank portion rigid with and extending from one end thereof and having a projection thereon, a closure element for the hook pivoted on the upper portion of said shank portion and tending to gravitate to a closed position, and a latch pivoted on the closure element and arranged to engage the aforesaid projection to lock said closure element releasably in closed position.

27. In a coupler device suitable for vehicle towing purposes, the combination with a stationary substantially semi-circular hook having an attaching shank portion rigid with and extending from one end thereof and having a projection thereon, a closure element for the hook pivoted on the upper portion of said shank portion and tending to gravitate to a closed position, and a latch pivoted on the closure element and arranged to engage the aforesaid projection to lock said closure element releasably in raised opened position.

28. In a coupler device of the character described, a hook member for connection to a draft member, comprising two abutting counterpart sheet metal body halves of hook form, said body halves having abutting shank portions bent outwardly in opposite directions relative to one another, to form attaching ears in substantially coplanar relation to one another, and reinforcing ribs formed in the shank portions extending diagonally between and integrally connecting the ears with the shank portions.

29. In a coupler device of the character described, a hook member for connection to a draft member, comprising two abutting counterpart sheet metal body halves of hook form, said body halves having abutting shank portions bent outwardly in opposite directions relative to one another, to form attaching ears in substantially coplanar relation to one another, reinforcing ribs formed in the shank portions extending diagonally between and integrally connecting the ears with the shank portions, and an attaching plate disposed in abutment with the backs of and adapted to interconnect said ears, the plate and ears having registering openings adapted to receive fastening elements for fastening the hook to a vehicle.

30. In a coupler device of the character described, a hook member for connection to a draft member, comprising two abutting counterpart sheet metal body halves of hook form having flanges provided thereon circumferentially of the outer diameter bent outwardly in opposite directions with respect to one another, the inner attaching ends of said body halves being formed to provide attaching ears bent outwardly in opposite directions with respect to one another substantially at right angles to the plane of the body and substantially in coplanar relation, the lower portions of said ears being coextensive with said circumferential flanges, and an attaching plate disposed in abutment with the backs of and adapted to interconnect said ears, the plate and ears having registering openings adapted to receive fastening elements for fastening the hook to a vehicle.

31. In a coupler device of the character described, a hook member for connection to a draft member, comprising two abutting counterpart sheet metal body halves of hook form having flanges provided thereon circumferentially of the outer diameter bent outwardly in opposite directions with respect to one another, the inner attaching ends of said body halves being formed to provide attaching ears bent outwardly in opposite directions with respect to one another substantially at right angles to the plane of the body and substantially in coplanar relation, the lower portions of said ears being coextensive with said circumferential flanges, reinforcing ribs formed in the shank portions extending diagonally between and integrally connecting the ears with the shank portions, and an attaching plate disposed in abutment with the backs of and adapted to interconnect said ears, the plate and ears having registering openings adapted to receive fastening elements for fastening the hook to a vehicle.

WILLIAM J. TIERNEY.

REFERENCES CITED

The following references are of record in the file of this patent:

UNITED STATES PATENTS

| Number | Name | Date |
|---|---|---|
| 1,018,728 | Scessions | Feb. 27, 1912 |
| 1,056,222 | Scessions | Mar. 18, 1913 |
| 774,903 | Ammann | Nov. 15, 1904 |
| 1,824,843 | Staley | Sept. 29, 1931 |
| 1,955,876 | Ferguson | Apr. 24, 1934 |

FOREIGN PATENTS

| Number | Country | Date |
|---|---|---|
| 389,954 | Great Britain | Mar. 30, 1933 |